Patented Oct. 8, 1929

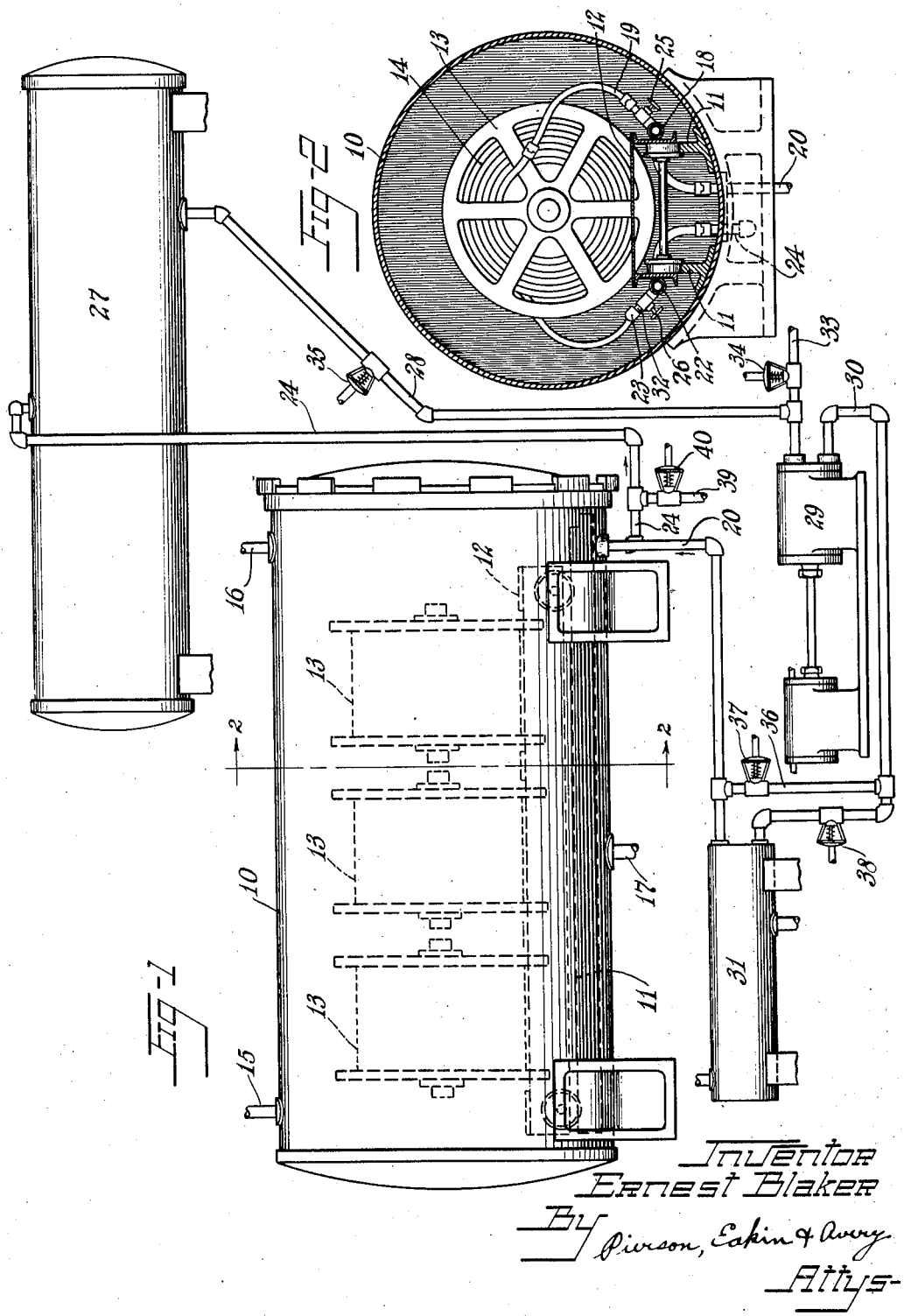

1,730,639

UNITED STATES PATENT OFFICE

ERNEST BLAKER, OF AKRON, OHIO, ASSIGNOR TO THE B. F. GOODRICH COMPANY, OF NEW YORK, N. Y., A CORPORATION OF NEW YORK

HOSE-VULCANIZING METHOD AND APPARATUS

Application filed March 24, 1927. Serial No. 177,956.

This invention relates to procedure and apparatus for vulcanizing hose under internal fluid pressure such as to distend the hose and shape it against a surrounding mold such as that afforded by the lead sheath commonly applied to the uncured hose by means of a lead-press.

My chief objects are to provide for economy of time in the vulcanizing operation, which I accomplish by passing a heating fluid through the hose to heat it from the interior; to provide for uniformity of temperature in a plurality of lengths of hose simultaneously vulcanized in the same vulcanizer, which I accomplish by so controlling the flow of the internal heating fluid as to provide substantially the same condition of heat transfer in the several lengths; and to provide uniformity of vulcanization throughout each length of the hose, which I accomplish by providing a controlled flow of the internal heating fluid through the hose at a sufficient velocity to keep up the temperature of the fluid and consequently of the hose in the vicinity of the outlet end of the hose as well as nearer the inlet end of the hose.

Of the accompanying drawings:

Fig. 1 is a diagrammatic elevation of apparatus embodying and adapted to carry out my invention in its preferred form.

Fig. 2 is a section on line 2—2 of Fig. 1.

Referring to the drawings, the apparatus comprises a vulcanizer 10 provided internally with rails 11, 11 for a car 12 supporting a number of hose-reels 12, 13 each having mounted thereon a length of lead-encased hose 14. The vulcanizer is provided with the usual steam conduits 15, 16, 17 for circulating steam therethrough.

Mounted on the car 12 is a supply-manifold 18, from which flexible branch pipes such as the pipe 19, Fig. 2, lead to the respective lengths of hose upon the reels 13, the flexible branch pipe being connected with one end of the length of hose, and the supply-manifold 18 being detachably connected to a supply pipe 20 leading to the exterior of the vulcanizer.

Also mounted upon the car 12 is an outlet manifold 22 into which pipes such as the pipe 23, Fig. 2, lead from the respective lengths of hose, having connection to the ends of the said lengths which are not connected to the pipes 19 of the supply-manifold. The outlet manifold 22 is detachably connected to an outlet pipe 24 extending to the exterior of the vulcanizer.

The manifolds and their branches are thus adapted for passing hot water through the several lengths of hose, and in order that less than the full number of reels of hose may be vulcanized under internal fluid pressure a stop valve 25 is interposed between each branch pipe 19 and the supply-manifold 18 and a stop valve 26 is interposed between each branch pipe 23 and the outlet manifold 22, permitting the closing of such branch pipes as are not to be used in any given vulcanizing operation.

For circulating hot water at high pressure through the hose the outlet pipe 24 from the manifold 22 runs to the top of a supply tank 27 from the bottom of which a pipe 28 runs to the intake of a pump 29 from the outlet of which a pipe 30 runs into a water heater 31 of which the outlet is the pipe 20 leading to the supply-manifold 18 within the vulcanizer.

For maintaining a high pressure upon the water in the hose, and preferably a pressure greater than that due to the temperature of the water, and at the same time effecting a suitable flow of water through the individual lengths of hose, each of the branch outlet pipes 23 from the respective lengths of hose connects with the outlet manifold 22 through a short pipe 32 of small bore such as to have a pronounced throttling effect upon the current of water, such throttling effect serving to maintain the pressure within the lengths of hose and to equalize the flow of water through the several units, when the units are of like diameter and length. The relative capacities of the several throttling pipes may of course be varied to correspond to different diameters or lengths of hose units vulcanized at the same or at different times.

As such throttled outlets are the determining factor in maintaining the pressure within the hose and controlling the rate of flow, the invention readily may be applied to vulcanizing equipment already in use in which branch inlet conduits are of different capacities, without modifying the inlet conduits to change their capacities.

In order that the hose after vulcanization may be cooled while still held distended against its lead sheath by internal fluid pressure, to avoid retraction of the inner plies and consequent ply separation while the rubber is hot and soft, connections are provided for substituting cold water for the hot water flowing through the hose.

These connections comprise a pipe 33 provided with a remote-control valve 34 and leading from a suitable source of cold water into the pump-intake pipe 28 between a remote-control valve 35 therein and the pump; a by-pass pipe 36 adapted to cut the water heater 31 out of the pump circuit upon the actuation of remote-control valves 37, 38 mounted in the by-pass pipe 36 and the heater-intake pipe 30 respectively; and a cold-water vent-pipe 39 branching from the outlet pipe 24 of the manifold 22 and provided with a remote-control valve 40. The several remote-control valves may have actuating connection to a suitable timing device (not shown) for actuating the valves automatically in accordance with a suitable time-temperature schedule.

In the operation of the apparatus, the vulcanizer being open, the car 12 with the reels of lead-sheathed hose is run thereinto upon the rails, the several lengths of hose are connected up with the two manifolds as described, and the vulcanizer is closed.

The valves 35 and 38 being open and the valves 40, 34 and 37 being closed, the pump 29 is operated to draw water from the supply tank 27, in which it may be at atmospheric pressure and approximately at boiling temperature, and force the water through the circuit including the heater 31, the manifold 18, the lengths of hose, the manifold 22, and the pipe 24, by which the water is returned to the supply tank.

The throttling effect of the small pipes 32 results in a high pressure within the hose such as to keep the water in liquid form although heated to vulcanizing temperature by the heater 31.

Steam is circulated through the vulcanizing chamber by means of the pipes 15, 16, 17, so that the hose is heated from the exterior as well as from the interior.

When vulcanization is completed the valves 35 and 38 are closed, stopping the supply of hot water to the hose, and the valves 34, 37 and 40 are opened, so that the pump draws cold water through the pipe 33 and forces it through the hose by way of the by-pass pipe 36, the cold water passing from the hose being disposed of through the pipe 39, and the throttling effect of the small pipes 32 serving to maintain the internal pressure within the hose while the latter cools.

The size of the throttling pipes 32 being properly correlated with the capacity of the pump, a suitable distending pressure is maintained in the hose with a velocity of flow such that the water does not very greatly fall in temperature in passing from the inlet to the outlet end of the hose.

Modifications of my invention are possible within the scope of the appended claims.

I claim:

1. The method of vulcanizing hose which comprises distending the hose against confining means by maintaining a distending fluid under pressure within the hose during vulcanization and cooling the hose in distended condition by maintaining a cooling fluid under pressure within the hose while causing it to flow therethrough.

2. Hose-vulcanizing apparatus comprising an inlet manifold for a plurality of lengths of hose, an outlet manifold having branch pipes adapted to be connected to the several lengths of hose, the branch pipes respectively being of such flow capacity as substantially to equalize the pressures within the several lengths of hose notwithstanding differences in the flow capacities of the inlet manifold elements leading to the respective lengths of hose, and means for supplying a heating fluid and a cooling fluid alternatively to said inlet manifold under pressure.

3. Hose-vulcanizing apparatus comprising a source of supply of hot fluid and a source of supply of cold fluid, means for forcing a hot pressure fluid from its source of supply into one end of a length of hose, means for imposing a throttling effect upon fluid flowing from the other end of the length of hose, means for externally confining the length of hose, and means for disconnecting the forcing means from the source of supply of hot fluid and connecting it with the source of supply of the cooling fluid.

In witness whereof I have hereunto set my hand this 11th day of March, 1927.

ERNEST BLAKER.